United States Patent
Gupta et al.

(10) Patent No.: US 12,001,685 B2
(45) Date of Patent: Jun. 4, 2024

(54) PERFORMING AN IN-LINE ERASURE CODING PROCESS USING A WRITE-AHEAD LOG

(71) Applicant: Cohesity, Inc., San Jose, CA (US)

(72) Inventors: Apurv Gupta, Bengaluru (IN); Akshat Agarwal, Delhi (IN)

(73) Assignee: Cohesity, Inc., San Jose, CA (US)

( * ) Notice: Subject to any disclaimer, the term of this patent is extended or adjusted under 35 U.S.C. 154(b) by 177 days.

(21) Appl. No.: 17/710,335

(22) Filed: Mar. 31, 2022

(65) Prior Publication Data

US 2023/0315303 A1 Oct. 5, 2023

(51) Int. Cl.
| | | |
|---|---|---|
| G06F 3/06 | (2006.01) | |
| G06F 3/00 | (2006.01) | |
| G06F 11/00 | (2006.01) | |
| G06F 11/10 | (2006.01) | |

(52) U.S. Cl.
CPC .......... G06F 3/0619 (2013.01); G06F 3/0652 (2013.01); G06F 3/0659 (2013.01); G06F 3/0689 (2013.01); G06F 11/1076 (2013.01)

(58) Field of Classification Search
CPC .. G06F 11/1076; G06F 3/0619; G06F 3/0652; G06F 3/0689; G06F 3/0659
See application file for complete search history.

(56) References Cited

U.S. PATENT DOCUMENTS

| | | | | |
|---|---|---|---|---|
| 10,481,834 | B2 * | 11/2019 | Olarig | G06F 12/123 |
| 10,481,979 | B2 * | 11/2019 | Pioch | G06F 11/1076 |
| 11,748,299 | B2 | 9/2023 | Yarlagadda et al. | |
| 2019/0324847 | A1 * | 10/2019 | McGlaughlin | G06F 3/061 |
| 2021/0173588 | A1 * | 6/2021 | Kannan | G06F 3/061 |
| 2022/0357891 | A1 * | 11/2022 | Wang | G06F 3/0629 |
| 2023/0237020 | A1 * | 7/2023 | Gupta | G06F 3/0689 |
| | | | | 707/692 |

OTHER PUBLICATIONS

Li, Shaohua, Improving software RAID with a write-ahead log, Dec. 28, 2015, https://engineering.fb.com/2015/12/28/core-infra/improving-software-raid-with-a-write-ahead-log/ (Year: 2015).*
U.S. Appl. No. 18/222,895, filed Jul. 17, 2023, naming inventors Yarlagadda et al.
Haddock et al., High Performance Erasure Coding for Very Large Stripe Sizes, SpringSim-HPC, 2019.
Hu et al., Exploiting Combined Locality for Wide-Stripe Erasure Coding in Distributed Storage, Proceedings of the 19th USENIX Conference on File and Storage Technologies, Feb. 2021, pp. 233-248.
Huang et al., Erasure Coding in Windows Azure Storage, 2012.

* cited by examiner

*Primary Examiner* — Justin R Knapp
(74) *Attorney, Agent, or Firm* — Shumaker & Sieffert, P.A.

(57) ABSTRACT

A plurality of data stripes and one or more parity stripes are generated using a plurality of data chunks stored in a write-ahead log based on an erasure coding configuration. The plurality of data stripes and the one or more parity stripes are stored on corresponding different storage devices. The plurality of data stripes and the one or more parity stripes are associated together under a data protection grouping container.

19 Claims, 4 Drawing Sheets

PERFORMING AN IN-LINE ERASURE CODING PROCESS USING A WRITE-AHEAD LOG

BACKGROUND OF THE INVENTION

Erasure Coding (EC) is a mathematical technique to store logically sequential data associated with an object across a plurality of disks such that in the event one or more of the disks become unavailable, the object is still able to be reconstructed. The object is segmented into a plurality of data stripes. Each data stripe is comprised of one or more data chunks and is stored on a different disk. One or more parity stripes are computed based on the plurality of data stripes and stored separately from the plurality of data stripes of the object. The one or more parity stripes enable the object to be reconstructed in the event one or more of the disks storing the data stripes associated with the object become unavailable.

BRIEF DESCRIPTION OF THE DRAWINGS

Various embodiments of the invention are disclosed in the following detailed description and the accompanying drawings.

DETAILED DESCRIPTION

Figure 1:
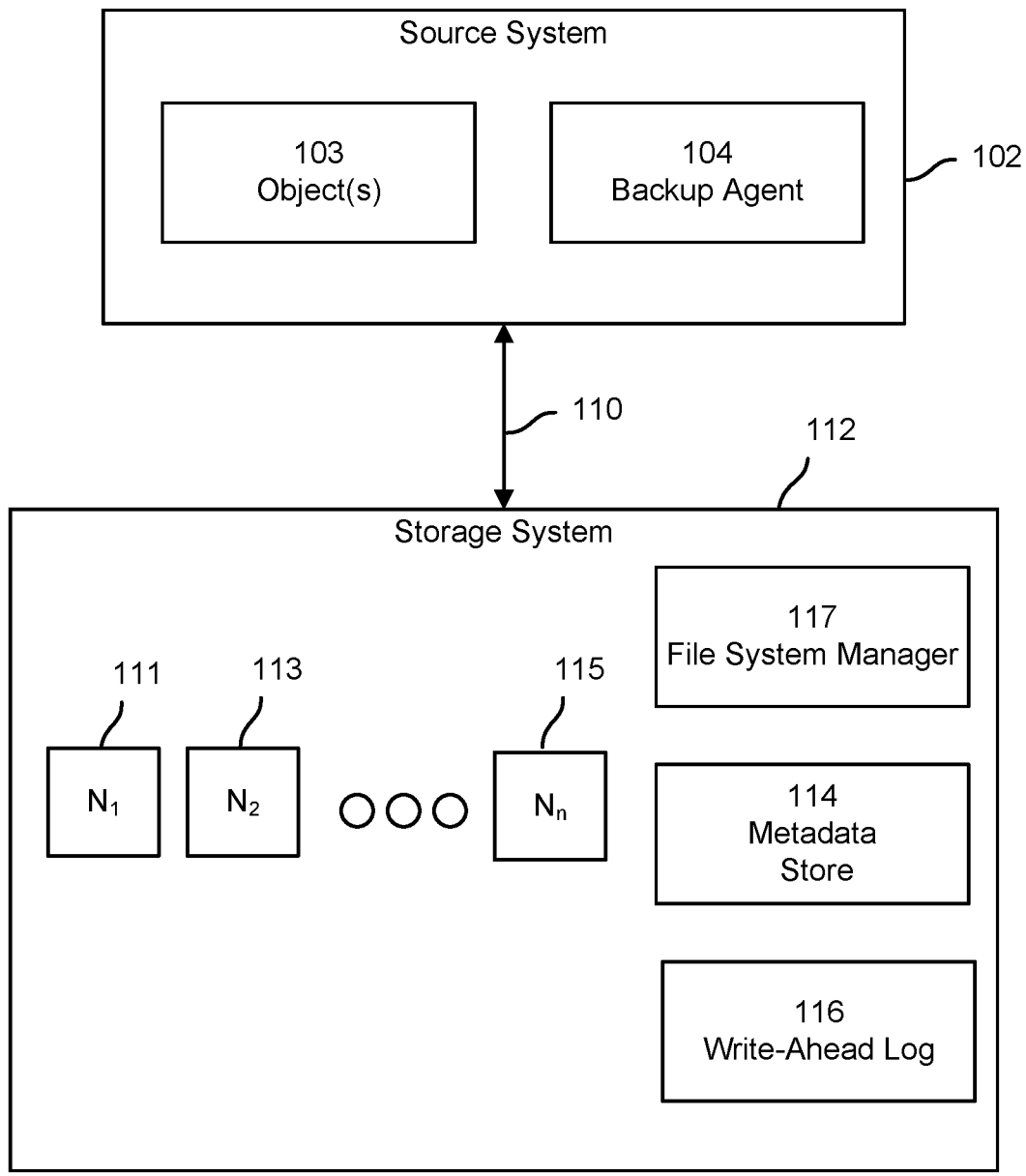
FIG. 1 is a block diagram illustrating an embodiment of a system for performing an in-line erasure coding process using a write-ahead log.

A storage system is comprised of a plurality of storage nodes. Each storage node may include one or more storage devices (e.g., disk storage, solid-state storage, flash storage, etc.). The storage system ingests data from a source system and stores the ingested data across the plurality of storage nodes. The data associated with the ingested data may be written (inline or post process) to a plurality of chunk files. A chunk file may have an EC configuration such that the chunk file is comprised of X data stripes and Y parity stripes.

The number of storage nodes may be increased to improve fault tolerance (e.g., can support more disk failures). However, some of the available storage devices storing data stripes associated with an object need to be read to reconstruct the object in the event one or more storage nodes storing data stripes associated with the object become unavailable. A width of a data stripe (i.e., the amount of data in one data stripe) may be increased to reduce the overhead associated with writing data to a data stripe. However, increasing the data stripe width may cause an inefficient use of storage space for small data writes (e.g., writing an amount of data that is less than a threshold amount) when applying the EC configuration for some objects.

For example, an EC configuration may require the data associated with a chunk file to be spread across 8 data stripes. A width of a data stripe may be configured to 1 MB. An example of a small data write amount for a 1 MB data stripe width is 256 kb. The storage system may receive a plurality of data chunks associated with an object having a cumulative size of 2 MB. To satisfy the EC configuration, the 2 MB of data is segmented into 256 kb data blocks and stored across 8 different storage devices. Each data stripe in this example stores 25% of its capacity.

To improve the usage of storage space associated with the data stripes, the storage system may perform a post process EC that writes to a new chunk file the data chunks associated with a first chunk file and the data chunks associated with one or more other chunk files. However, such as post process EC requires the data chunks associated with the first and one or more other chunk files to be read, the data chunks associated with the first and one or more other chunk files to be written to the new chunk file, and the metadata associated with data chunks included in the first and one or more other chunk files to be updated to reference the new chunk file instead of the first chunk file or the one or more other chunk files. This post process EC may require a significant amount of IOPS (input/output operations per second) resources to be performed.

A technique to perform efficient resilient writes from a write-ahead log is disclosed. Instead of using a portion of a chunk file as a data stripe, the disclosed technique utilizes an entire chunk file as a data stripe. The disclosed technique creates a data protection grouping container (e.g., a logical grouping) for a plurality of chunk files by performing an in-line EC process. As a result, the number of IOPS needed to perform EC is reduced because the storage system does not need to write the data chunks associated with a plurality of chunk files to a new chunk file and update the metadata for the data chunks associated with the plurality of chunk files.

A storage system ingests data from a source system and stores the ingested data in a write-ahead log. In some embodiments, the storage system chunks the ingested data into a plurality of data chunks (e.g., variable sized data chunks or fixed-sized data chunks) and stores the plurality of data chunks in a write-ahead log. In some embodiments, the storage system receives the plurality of data chunks from the source system and stores the plurality of data chunks in the write-ahead log. The received data chunks may be deduplicated against data chunks already stored by the storage system.

The storage system generates a plurality of data stripes and one or more parity stripes using data chunks stored in the write-ahead log based on an EC configuration. The EC configuration specifies the number of data stripes, a size of a data stripe, a threshold tolerance for the data stripe, and the number of parity stripes. For example, the EC configuration may require eight data stripes having a particular data size within a threshold tolerance and two parity stripes. The storage system designates data chunks included in the write-ahead log into chunk file groups having the particular data size within the threshold tolerance.

In some embodiments, the data chunks stored in the write-ahead log are deduplicated with respect to the data chunks already stored by the storage system before the data stripes are generated. After deduplication, the storage system may determine whether a threshold size of data chunks remain in the write-ahead log to achieve the EC configuration. The write-ahead log may store the threshold size of data chunks needed to achieve the EC configuration in the event each of the generated data stripes have a threshold capacity of data chunks. In response to a determination that the write-ahead log stores the threshold size of data chunks, the storage system maintains the EC configuration. In response to a determination that the write-ahead log does not store the threshold size of data chunks, the storage system selects an alternate EC configuration. In some embodiments, the alternate configuration reduces the number of data stripes. In some embodiments, the alternate EC configuration reduces a size of a data stripe. In some embodiments, the alternate EC configuration reduces the number of data stripes and a size of a data stripe. In some embodiments, the data stripes are replicated instead of selecting an alternate EC configuration. In some embodiments, the storage system waits a threshold amount of time before selecting an alternate EC configuration to determine whether the source system is providing additional data that may enable the EC configuration to be maintained. In some embodiments, the storage system determines whether the amount of data stored by the storage device on which the write-ahead log resides is approaching or is greater than a threshold amount to determine whether to select an alternate erasure coding configuration.

The storage system performs the in-line EC process by reading the data chunks associated with a chunk file group and writing the data chunks to a selected storage device as a chunk file. For example, the storage system may read the data chunks associated with a first chunk file group and write the data chunks to a first selected storage device as a first chunk file, read the data chunks associated with a second chunk file group and write the data chunks to a second selected storage device as a second chunk file, . . . , and read the data chunks associated with an nth chunk file group and write the data chunks to an nth selected storage device as an nth chunk file. Each chunk file corresponds to one of the data stripes associated with the EC configuration and is stored on a different storage device. A storage device may be selected based on one or more selection criteria, such as performance characteristics associated with a storage device (e.g., storage capacity, storage throughput, storage utilization, etc.), wear characteristics associated with a storage device, a storage node that includes the storage device, a chassis including the storage node that includes the storage device, a rack including the chassis including the storage node that includes the storage device, and/or a combination thereof. After a chunk file corresponding to a data stripe or a parity stripe associated with a data protection grouping container is written to a storage device, the storage system is prevented from writing other data stripe(s) or parity stripe(s) associated with the data protection grouping container to the storage device.

In some embodiments, the storage system reads the data chunks associated with a subsequent chunk file group in parallel as the storage system is writing the data chunks associated with a previous chunk file group to a selected storage device. For example, the storage system may read the data chunks associated with a second chunk file group in parallel as the storage system is writing the data chunks associated with the first chunk file group to a first selected storage device. In some embodiments, the storage system reads, in parallel, the data chunks associated with all of the chunk file groups and writes, in parallel, the data chunks to selected storage devices as corresponding chunk files.

The storage system further performs the in-line EC process by generating one or more parity stripes using the same reads that were used to generate the data stripes on which the one or more parity stripes are based. The storage system generates a parity stripe storing parity data. The parity data may be segmented into groups and each group may store a corresponding checksum. The storage system may issue a read for a group needed to reconstruct or validate a data stripe without having to read all of the parity data. The storage system stores the parity stripe on a corresponding storage device that is different than the other storage devices associated with the data protection grouping container. That is, the parity stripe associated with the data protection grouping container may not be stored on the same storage device as other chunk files associated with the data protection grouping container. For example, a first data stripe is stored as a chunk file on a first storage device, a second data stripe is stored as a chunk file on a second storage device, . . . , an eighth data stripe is stored as a chunk file on an eighth storage device, a first parity stripe is stored on a ninth storage device, and a second parity stripe is stored on a tenth storage device. The storage system updates a chunk file metadata table to include an entry corresponding to the parity stripe. The entry corresponding to the parity stripe indicates a storage device and/or storage node on which the parity stripe is stored. In some embodiments, the storage system generates a parity stripe based on some of the data stripes. For example, a first parity stripe may be generated based on some or all of the data chunks included in a first subset of the data stripes and a second parity stripe may be generated based on the data chunks included in a second subset of the data stripes. The first subset and the second subset may overlap or be disjointed. In some embodiments, the storage system generates a parity stripe based on all of the data stripes.

In some embodiments, the storage system generates one or more parity stripes after some of the data stripes have been generated and stores the one or more parity stripes on corresponding storage devices, but before all of the data stripes associated with the data protection grouping container have been generated. For example, the first parity stripe may be generated and stored after the first data stripes are generated, but before the storage system generates the last four data stripes. The first parity stripe may be generated while the storage system is generating some of the last four data stripes. In some embodiments, the storage system generates one or more parity stripes after all of the data stripes have been generated.

The storage system further performs the in-line EC process by creating a data protection grouping container (e.g., a logical grouping) by associating the plurality of data stripes with the one or more parity stripes that are generated based on the plurality of data stripes. The storage system maintains a data protection grouping container metadata data structure (e.g., a table), a chunk metadata data structure (e.g., a table), and a chunk file metadata data structure (e.g., a table). The storage system creates the data protection grouping container by updating the data protection grouping metadata data structure to include an entry that identifies the plurality of data stripes, the one or more parity stripes, and a corresponding storage location for each of the data stripes and the one or more parity stripes. In the event a storage device storing a chunk file (e.g., one of the data stripes or one of the parity stripes) included in a data protection grouping container becomes unavailable, the storage system may utilize the data protection grouping container metadata data structure, the remaining data stripes, and the one or more parity stripes to reconstruct the unavailable chunk file.

The chunk metadata data structure indicates the data chunks that are already stored by the storage system and a corresponding chunk file for each of the data chunks. An entry of the chunk metadata data structure may associate a chunk identifier associated with a data chunk with a chunk file identifier of a chunk file storing the data chunk (e.g., the chunk file corresponding to the data stripe). A chunk identifier may be a cryptographic hash function value (e.g., SHA-1, SHA-2, etc.).

The chunk file metadata data structure includes a plurality of entries corresponding to a plurality of chunk files. Each entry indicates the one or more data chunks that are stored in a chunk file corresponding to the entry. The entry may include offset and length information for each of the one or more data chunks included in a chunk file.

When generating a chunk file corresponding to a data stripe, the storage system updates the chunk metadata data structure to include a corresponding entry for each of the data chunk(s) that are included in the chunk file. The corresponding entry associates a chunk identifier associated with the data chunk with a temporary chunk file placeholder. After the chunk files corresponding to the data stripes are written to corresponding storage devices of the storage system, the storage system updates the chunk file metadata data structure to indicate the data chunks that are stored in each of the chunk files. In some embodiments, there are two or more competing writes for the same data chunk that is stored in the write-ahead log (e.g., there are two different chunk files associated with two different objects that include the same data chunk). For each data chunk included in a chunk file corresponding to a data stripe, the storage system determines whether the temporary chunk file placeholder associated with the entry corresponding to the data chunk has been updated to reference a different chunk file. In response to a determination that the temporary chunk file placeholder associated with the entry corresponding to the data chunk has been updated to reference a different chunk file (e.g., due to a competing write associated with a different chunk file), the storage system updates an entry of the chunk file metadata data structure corresponding to the chunk file that includes the data chunk not to reference the data chunk. In response to a determination that the temporary chunk file placeholder associated with the entry corresponding to the data chunk has not been updated to reference a different chunk file, the storage system updates the entry corresponding to the data chunk to reference the chunk file (e.g., storing a chunk file identifier associated with the chunk file) instead of the temporary chunk file placeholder.

After the chunk files corresponding to the data stripes and the one or more parity stripes are stored on corresponding storage devices of the storage system, the storage system completes the in-line EC process by removing data chunks included in the plurality of data stripes from the write-ahead log. As a result of performing the in-line EC process, the storage system was able to efficiently perform resilient writes in a manner that used significantly less IOPS than the post process EC described above.

FIG. 1 is a block diagram illustrating an embodiment of a system for performing an in-line erasure coding process using a write-ahead log. In the example shown, system 100 includes source system 102 that is coupled to storage system 112 via network connection 110. Network connection 110 may be a LAN, WAN, intranet, the Internet, and/or a combination thereof.

Source system 102 is a computing system that stores file system data. The file system data may include a plurality of files (e.g., content files, text files, object files, etc.) and metadata associated with the plurality of files. Source system 102 may be comprised of one or more servers, one or more computing devices, one or more storage devices, and/or a combination thereof. A backup of source system 102 may be performed according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with source system 102.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more objects 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 includes storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. A storage device may be a solid-state drive, a hard disk drive, a flash storage device, etc. The plurality of storage devices may include one or more solid state drives, one or more hard disk drives, one or more flash storage devices, or a combination thereof.

In some embodiments, a storage node of storage system 112 includes a processor, memory, and a storage device. The storage node may be coupled to a separate storage appliance. The separate storage appliance may include one or more storage devices. A storage device may be segmented into a plurality of partitions. Each of the nodes 111, 113, 115 may be allocated one or more of the partitions. The one or more partitions allocated to a storage node may be configured to store data associated with some or all of the plurality of objects that were backed up to storage system 112. For example, the separate storage appliance may be segmented into 10 partitions and storage system 112 may include 10 storage nodes. A storage node of the 10 storage nodes may be allocated one of the 10 partitions.

Storage system 112 may be a cloud instantiation of a backup system. A configuration of cloud instantiation of storage system 112 may be a virtual replica of a backup system. For example, a backup system may be comprised of three storage nodes, each storage node with a storage capacity of 10 TB. A cloud instantiation of the backup system may be comprised of three virtual nodes, each virtual node with a storage capacity of 10 TB. In other embodiments, a cloud instantiation of a backup system may have more storage capacity than an on-premises instantiation of a backup system. In other embodiments, a cloud instantiation of a backup system may have less storage capacity than an on-premises instantiation of a backup system.

Storage system 112 performs a data management operation (e.g., backup, replication, tiering, migration, archiving, etc.) for source system 102 by ingesting source data from source system 102 to write-ahead log 116 and storing the data as a plurality of data chunks in one or more chunk files that are stored on one or more storage devices associated with one or more storage nodes 111, 113, 115 of storage system 112. In some embodiments, storage system 112 chunks the ingested data into a plurality of data chunks (e.g., variable sized data chunks) and stores the plurality of data chunks in write-ahead log 116. In some embodiments, storage system 112 receives the plurality of data chunks from source system 102 and stores the plurality of data chunks in the write-ahead log 116. In some embodiments, write-ahead log 116 is distributed across the solid-state drives associated with storage nodes 111, 113, 115. In some embodiments, write-ahead log 116 is included in a solid-state drive associated with one of the storage nodes 111, 113, 115. In some embodiments, write-ahead log 116 is distributed across some of the storage nodes 111, 113, 115.

Storage system 112 includes a file system manager 117 that is configured to generate metadata that organizes the file system data of the backup. An example of metadata generated by the storage system is a tree data structure as described in U.S. patent application Ser. No. 17/476,873 entitled MANAGING OBJECTS STORED AT A REMOTE STORAGE file Sep. 16, 2021, which is incorporated herein by reference for all purposes. Storage system 112 may store a plurality of tree data structures in metadata store 114, which is accessible by storage nodes 111, 113, 115. Storage system 112 may generate a snapshot tree and one or more corresponding metadata structures for each data management operation performance. Metadata store 114 may be stored in a memory of storage system 112. Metadata store 114 may be a distributed metadata store and stored in the memories of storage nodes 111, 113, 115.

In the event performing the data management operation corresponds to performing the data management operation with respect to all of the file system data of source system 102, a view corresponding to the data management operation performance may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event performing the data management operation corresponds to performing the data management operation with respect to all of the object data of one of the one or more objects 103 (e.g., a backup of a virtual machine), a view corresponding to the data management operation performance may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure.

A leaf node of a metadata structure may store metadata information, such as an identifier of a data brick associated with one or more data chunks and information associated with the one or more data chunks. In some embodiments, the information associated with the one or more data chunks includes corresponding object offsets and corresponding chunk identifiers associated with the one or more data chunks. In some embodiments, the information associated with the one or more data chunks also includes corresponding chunk file identifiers associated with one or more chunk files storing the data chunks.

In some embodiments, the location of the one or more data chunks associated with a data brick is identified using a chunk metadata data structure and a chunk file metadata data structure stored in metadata store 114. In some embodiments, the location of the one or more data chunks associated with a data brick is identified using a chunk file metadata data structure stored in metadata store 114. The chunk file metadata data structure may include a plurality of entries where each entry associates a chunk identifier associated with a data chunk with a chunk file identifier of a chunk file storing the data chunk, an offset, and a size. The chunk file metadata structure may indicate which storage node of storage system 112 is storing a replicated chunk file. The chunk file metadata structure may indicate a storage node of storage system 112 storing a data chunk that is part of a chunk file stored on a single node or across a plurality of storage nodes.

In some embodiments, for data chunks having an entry in the chunk metadata data structure, the location of a data chunk may be determined by traversing a tree data structure to a leaf node and determining a chunk identifier associated with the data chunk. The chunk metadata data structure may be used to determine a chunk file identifier of a chunk file storing the data chunk. The chunk file metadata data structure may be used to determine a location of the data chunk within the chunk file corresponding to the determined chunk file identifier.

Storage system 112 maintains in metadata store 114 a data protection grouping container metadata data structure. The data protection grouping container metadata data structure includes a corresponding entry for each data protection grouping container. An entry indicates the plurality of chunk files included in a data protection grouping container and the corresponding storage nodes storing each of the plurality of chunk files. The entry also indicates the one or more parity stripes included in a data protection grouping container and the one or more corresponding storage nodes storing each of the one or more parity stripes.

In some embodiments, a plurality of parity stripes is determined. Some parity stripes may be determined using local reconstruction codes (LRC). A first parity stripe may be based on all of the data stripes included in the data protection grouping container. A second parity stripe may be based on a first subset of the data stripes included in the data protection grouping container. One or more other parity stripes may be based on one or more other subsets of the data stripes included in the data protection grouping container.

In some embodiments, parity stripe replicas may be computed and stored on different storage devices than the parity stripe of which it is a replica. For example, a first global parity stripe (e.g., computed based on all of the data stripes included in the data protection grouping container) may be stored on a first storage device and a replica of the first global parity stripe may be stored on a second storage device. A first local parity stripe (e.g., computed based on a subset of the data stripes included in the data protection grouping container) may be stored on a third storage device and a replica of the first local parity stripe may be stored on a fourth storage device. One or more other parity stripes may be stored on one or more corresponding storage devices and one or more corresponding replicas of the one or more other parity stripes may be stored on one or more other storage devices.

In some embodiments, a chunk file corresponding to a data stripe or a parity stripe associated with a data protection grouping container may be written to the same storage device as one or more other data stripe(s) or parity stripe(s) associated with the data protection grouping container. In some embodiments, the EC configuration may require more data stripes and parity stripes than available storage devices. The storage system may still be fault tolerant in the event some of the storage devices become unavailable.

Figure 2:
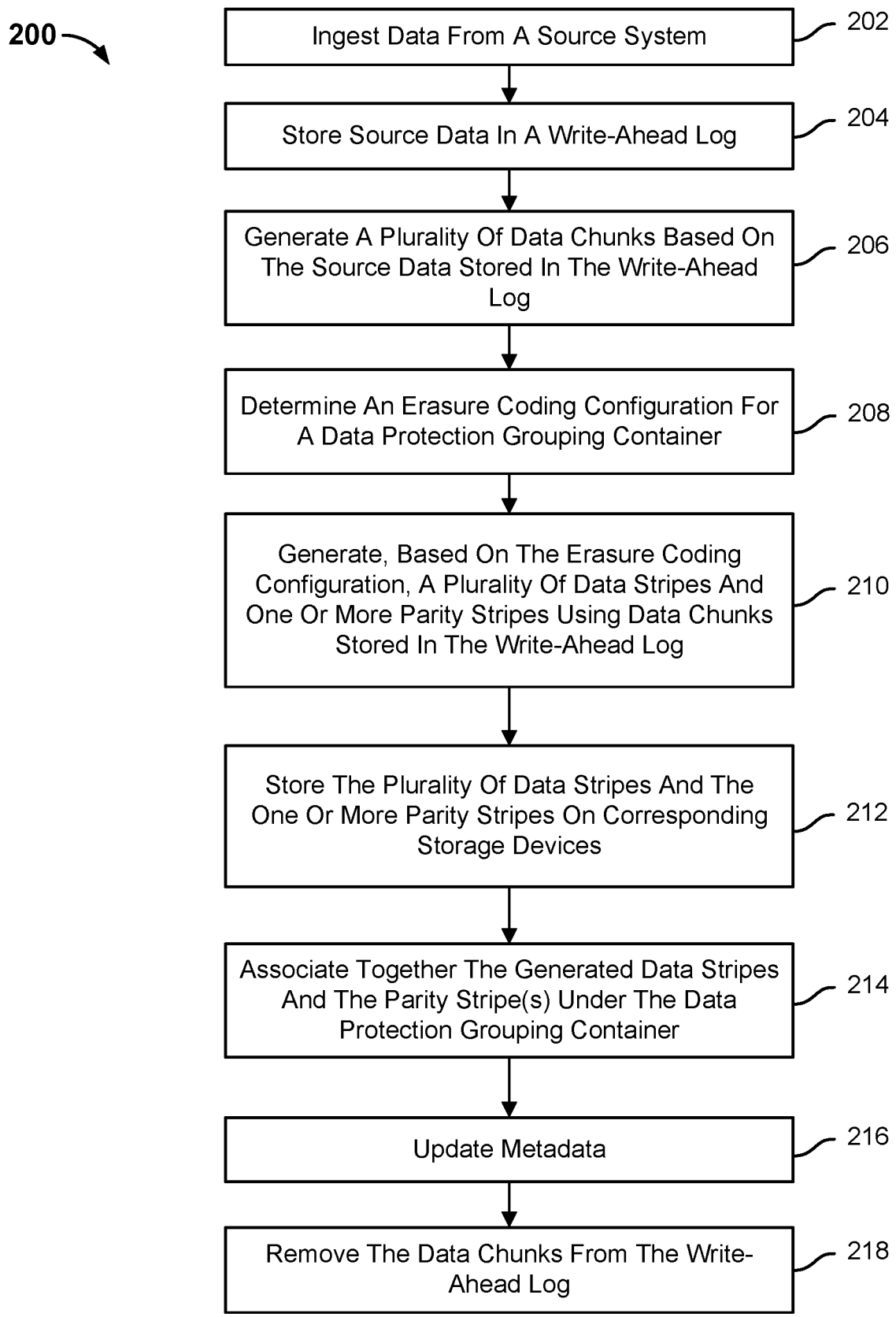
FIG. 2 is a flow diagram illustrating a process for performing an in-line erasure coding process using a write-ahead log in accordance with some embodiments.

FIG. 2 is a flow diagram illustrating a process of performing an in-line erasure coding process using a write-ahead log in accordance with some embodiments. In the example shown, process 200 may be implemented by a storage system, such as storage system 112.

At 202, data is ingested from a source system.

At 204, the source data is stored in a write-ahead log.

At 206, a plurality of data chunks are generated based on the source data stored in the write-ahead log. In some embodiments, the storage system chunks the ingested data into a plurality of data chunks (e.g., variable sized data chunks or fixed-sized data chunks) and stores the plurality of data chunks in a write-ahead log. In some embodiments, the storage system receives the plurality of data chunks from the source system and stores the plurality of data chunks in the write-ahead log.

At 208, an EC configuration is determined for a data protection grouping container. In some embodiments, a default EC configuration is determined for the data protection grouping container. In some embodiments, a specified EC configuration is determined for the data protection grouping container. In some embodiments, the data chunks stored in the write-ahead log are deduplicated before the plurality of data stripes and the one or more parity stripes are generated. Afterwards, a threshold size of data chunks may not remain in the write-ahead log. As a result, an alternate EC configuration is selected for the data protection grouping.

At 210, a plurality of data stripes and one or more parity stripes are generated using data chunks stored in the write-ahead log based on the EC configuration. The EC configuration specifies the number of data stripes, a size of a data stripe, a threshold tolerance, and the number of parity stripes. For example, the EC configuration may require eight data stripes having a particular data size within a threshold tolerance and two parity stripes.

The storage system designates chunks included in the write-ahead log into chunk file groups having the particular data size within the threshold tolerance. The storage system may read the data chunks associated with a chunk file group and write the data chunks to a selected storage device as a chunk file. For example, the storage system may read the data chunks associated with a first chunk file group and write the data chunks to a first selected storage device as a first chunk file, read the data chunks associated with a second chunk file group and write the data chunks to a second selected storage device as a second chunk file, . . . , and read the data chunks associated with an nth chunk file group and write the data chunks to an nth selected storage device as an nth chunk file.

In some embodiments, the storage system reads the data chunks associated with a subsequent chunk file group as the storage system is writing the data chunks associated with a previous chunk file group to a selected storage device.

In some embodiments, the storage system reads, in parallel, the data chunks associated with all of the chunk file groups and writes, in parallel, the data chunks associated with all of the chunk file groups to selected storage devices as corresponding chunk files.

The storage system generates one or more parity stripes in parallel with the data stripe writing process using the same reads that were used to generate the data stripes on which the one or more parity stripes are based. The storage system generates a parity stripe storing parity data. The parity data may be segmented into groups and each group may store a corresponding checksum. The storage system may issue a read for a group needed to reconstruct or validate a data stripe without having to read all of the parity data. In some embodiments, the storage system generates a parity stripe based on some of the data stripes. In some embodiments, the storage system generates a parity stripe based on all of the data stripes.

At 212, the plurality of data stripes and the one or more parity stripes are stored on corresponding storage devices. The chunk files corresponding to the data stripes and the one or more parity stripes each are stored on different storage devices. A storage device may be selected based on one or more selection criteria, such as performance characteristics associated with a storage device (e.g., storage capacity, storage throughput, storage utilization, etc.), a wear of a storage device, a storage node that includes the storage device, a chassis including the storage node that includes the storage device, a rack including the chassis including the storage node that includes the storage device, and/or a combination thereof.

In some embodiments, the storage system generates one or more parity stripes after all of the data stripes have been generated. In some embodiments, the storage system generates one or more parity stripes after some of the data stripes have been generated and stores the one or more parity stripes as corresponding chunk files on corresponding storage devices, but before all of the data stripes associated with the EC configuration have been generated. Steps 206 and 208 may be performed in parallel.

At 214, the generated data stripes and the one or more parity stripes are associated together under a data protection grouping container. The storage system maintains a data protection grouping container metadata data structure. The storage system creates the data protection grouping container by updating the data protection grouping metadata data structure to include an entry that identifies the plurality of data stripes, the one or more parity stripes, and a corresponding storage location for each of the data stripes and the one or more parity stripes. In the event a storage device storing a chunk file (e.g., one of the data stripes or one of the parity stripes) included in a data protection grouping container becomes unavailable, the storage system may utilize the data protection grouping container metadata data structure, the remaining data stripes, and the one or more parity stripes to reconstruct the unavailable chunk file.

At 216, metadata is updated. The storage system maintains a chunk metadata data structure and a chunk file metadata data structure. The chunk metadata data structure indicates the data chunks that are already stored by the storage system and a corresponding chunk file for each of the data chunks. An entry of the chunk metadata data structure may associate a chunk identifier associated with a data chunk with a chunk file identifier of a chunk file storing the data chunk (e.g., the chunk file corresponding to the data stripe). A chunk identifier may be a cryptographic hash function value (e.g., SHA-1, SHA-2, etc.). After the chunk files corresponding to the data stripes are written to corresponding storage devices of the storage system, the storage system may update the chunk metadata data structure to indicate the corresponding location for each of the data chunks included in the data stripes and the chunk file metadata data structure to indicate the corresponding data chunks included in each of the chunk files.

At 218, the data chunks included in the plurality of data stripes are removed from the write-ahead log.

Figure 3:
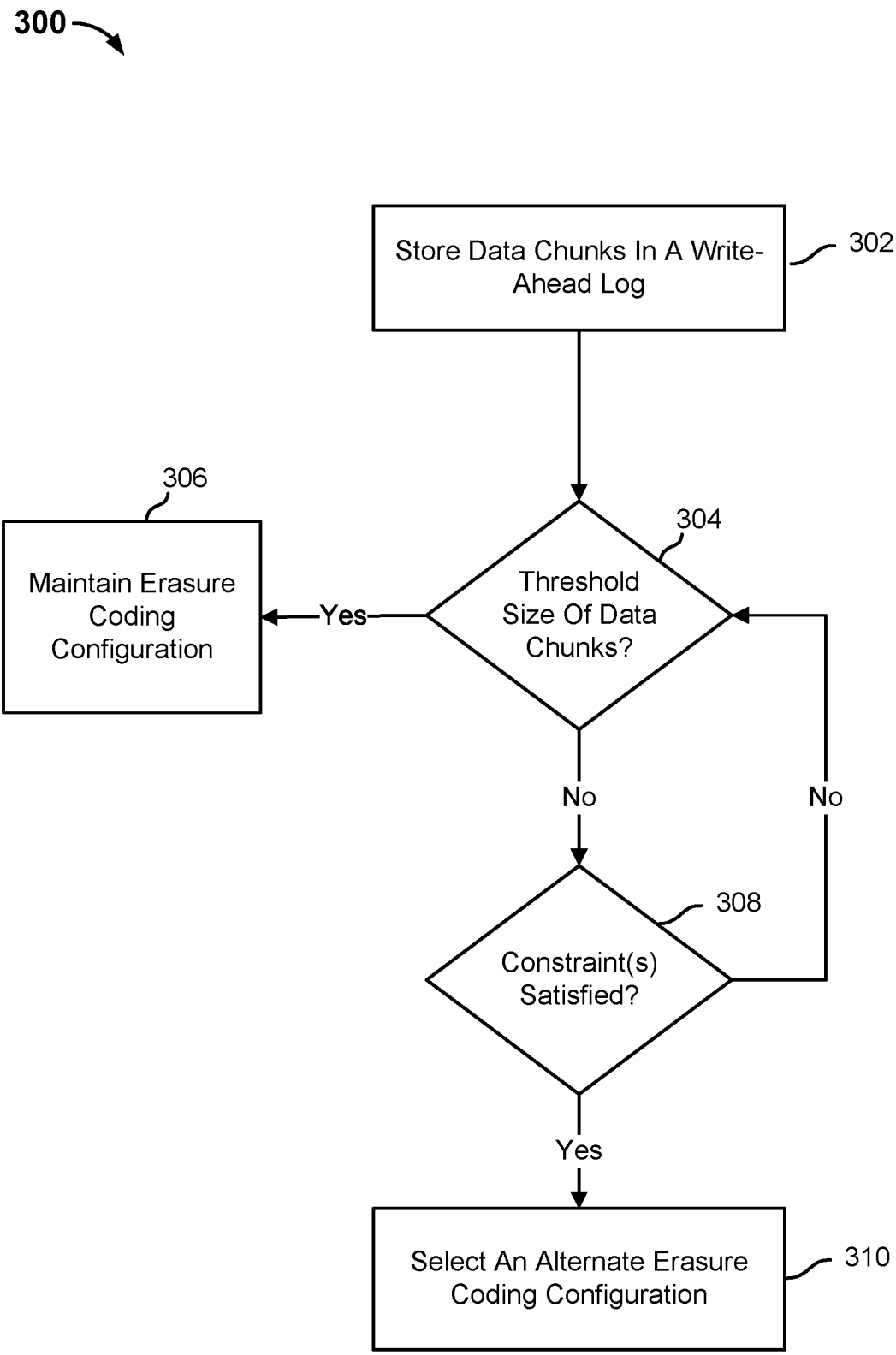
FIG. 3 is a flow diagram illustrating a process for determining an erasure coding configuration for a data protection grouping container in accordance with some embodiments.

FIG. 3 is a flow diagram illustrating a process for determining an erasure coding configuration for a data protection grouping container in accordance with some embodiments. In the example shown, process 300 may be implemented by a storage system, such as storage system 112. In some embodiments, process 300 is implemented to perform some or all of step 208 of process 200.

At 302, data chunks are stored in a write-ahead log. In some embodiments, the data chunks stored in the write-ahead log are deduplicated with respect to data chunks already stored by the storage system and/or with respect to other data chunks included in the write-ahead log. Each data chunk in the write-ahead log has a corresponding chunk identifier. The storage system may remove duplicate data chunks having the same chunk identifier.

At 304, it is determined whether a threshold size of data chunks is included in the write-ahead log to achieve the erasure coding configuration. In response to a determination that the threshold size of data chunks is included in the write-ahead log, process 300 proceeds to 306 where the erasure coding configuration is maintained. In response to a determination that the threshold size of data chunks is not included in the write-ahead log, process 300 proceeds to 308. For example, deduplicating data chunks stored in the write-ahead log with respect to data chunks already stored by the storage system may reduce a size of the data chunks to be below the threshold size of data chunks.

At 308, it is determined whether one or more constraints are satisfied. In some embodiments, a constraint is a threshold amount of time. In some embodiments, a constraint is space pressure of a storage device on which the write-ahead log resides (e.g., the amount of data stored by the storage device is approaching or greater than a threshold amount). In the event the one or more constraints are satisfied, process 300 proceeds to 310. In the event the one or more constraints are not satisfied, process 300 returns to 304. In some embodiments, step 308 is optional.

At 310, an alternate erasure coding configuration is selected. In some embodiments, the alternate EC configuration reduces the number of data stripes. For example, the number of data stripes is reduced from eight to six. In some embodiments, the alternate EC configuration reduces a size of a data stripe. In some embodiments, the alternate EC configuration reduces the number of data stripes and a size of a data stripe.

Figure 4:
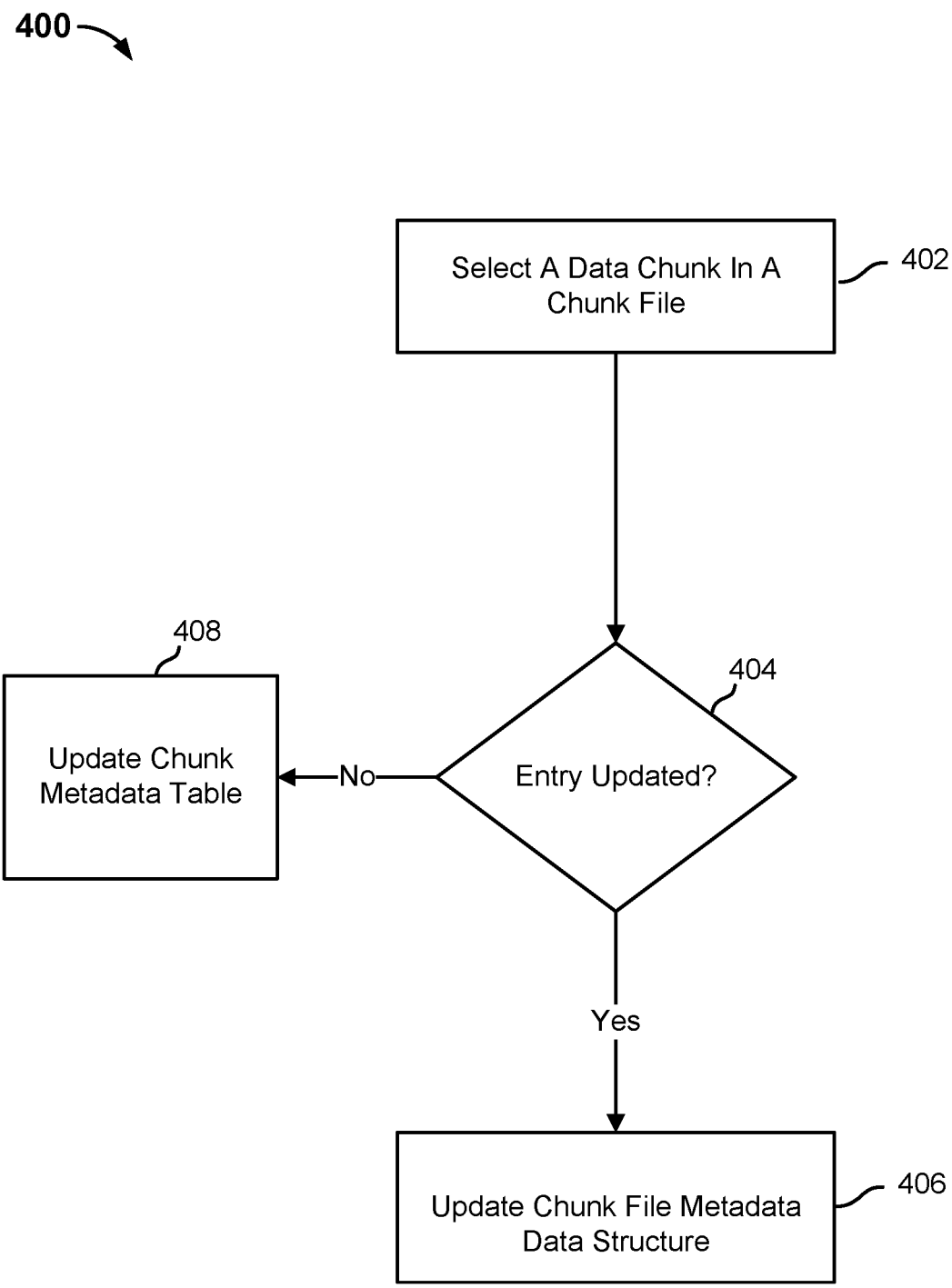
FIG. 4 is a flow diagram illustrating a process for updating metadata in accordance with some embodiments.

FIG. 4 is a flow diagram illustrating a process for updating metadata in accordance with some embodiments. In the example shown, process 400 may be implemented by a storage system, such as storage system 112. In some embodiments, process 400 may be implemented to perform some of step 216 of process 200.

At 402, a data chunk in a chunk file is selected. When generating a data stripe, the storage system may update a chunk metadata data structure to include an entry that indicates the data chunk is to be written to a chunk file. The entry may associated a chunk identifier associated with the data chunk with a temporary chunk file placeholder.

At 404, it is determined whether the chunk metadata data structure entry corresponding to the data chunk has been updated.

In response to a determination that the chunk metadata data structure entry corresponding to the data chunk has been updated (e.g., a competing write updated the entry to reference a different chunk file), process 400 proceeds to 406. In response to a determination that the chunk metadata data structure entry corresponding to the data chunk has not been updated, process 400 proceeds to 408.

At 406, an entry of the chunk file metadata data structure corresponding to the chunk file storing the data chunk is updated not to reference the data chunk.

At 408, the chunk metadata data structure is updated. The entry of the chunk metadata data structure corresponding to the data chunk is updated to reference the chunk file that includes the data chunk instead of the temporary chunk file placeholder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    generating, based on an erasure coding configuration, a plurality of chunk file groups from a plurality of data chunks stored in a write-ahead log;
    generating, based on the plurality of chunk file groups, a plurality of data stripes and one or more parity stripes using the plurality of data chunks stored in the write-ahead log;
    storing the plurality of data stripes and the one or more parity stripes on corresponding different storage devices; and
    associating together the plurality of data stripes and the one or more parity stripes under a data protection grouping container.

2. The method of claim 1, further comprising removing the plurality of the data chunks from the write-ahead log.

3. The method of claim 1, wherein each of the plurality of data stripes is a corresponding chunk file.

4. The method of claim 1, further comprising ingesting source data from a source system.

5. The method of claim 4, wherein ingesting the source data from the source system includes chunking the data into the plurality of data chunks or receiving the plurality of data chunks from the source system.

6. The method of claim 1, wherein generating, based on the plurality of chunk file groups, the plurality of data stripes and the one or more parity stripes using the plurality of data chunks stored in the write-ahead log includes deduplicating the plurality of data chunks stored in the write-ahead log.

7. The method of claim 6, further comprising determining whether a threshold size of data chunks remain in the write-ahead log.

8. The method of claim 7, wherein the erasure coding configuration is maintained based on determining the threshold size of data chunks remain in the write-ahead log.

9. The method of claim 7, further comprising waiting a threshold period of time based on a determination that the threshold size of data chunks do not remain in the write-ahead log.

10. The method of claim 7, further comprising selecting an alternate erasure coding configuration based on a determination that the threshold size of data chunks do not remain in the write-ahead log.

11. The method of claim 10, wherein the alternate erasure coding configuration decreases a number of data stripes included in the erasure coding configuration.

12. The method of claim 10, wherein the alternate erasure coding configuration decreases a size of a data stripe included in the erasure coding configuration.

13. The method of claim 1, further comprising updating metadata that enables the plurality of data chunks to be located.

14. The method of claim 13, wherein updating the metadata that enables the plurality of data chunks to be located includes selecting a data chunk included in one of the plurality of data stripes.

15. The method of claim 14, wherein updating the metadata that enables the plurality of data chunks to be located further includes determining whether an entry of a chunk metadata data structure corresponding to the data chunk has been updated.

16. The method of claim 15, wherein updating the metadata that enables the plurality of data chunks to be located further includes updating an entry of a chunk file metadata data structure not to reference the data chunk based on a determination that the entry of the chunk metadata data structure corresponding to the data chunk has been updated.

17. The method of claim 15, wherein updating the metadata that enables the plurality of data chunks to be located further includes updating the entry of the chunk metadata data structure to reference a chunk file storing the data chunk.

18. A computer program product embodied in a non-transitory computer readable medium and comprising computer instructions for:

generating, based on an erasure coding configuration, a plurality of chunk file groups from a plurality of data chunks stored in a write-ahead log;

generating, based on the plurality of chunk file groups, a plurality of data stripes and one or more parity stripes using the plurality of data chunks stored in the write-ahead log;

storing the plurality of data stripes and the one or more parity stripes on corresponding different storage devices; and associating together the plurality of data stripes and the one or more parity stripes under a data protection grouping container.

19. A system, comprising:

a processor configured to:
  generate, based on an erasure coding configuration, a plurality of chunk file groups from a plurality of data chunks stored in a write-ahead log;
  generate, based on the plurality of chunk file groups, a plurality of data stripes and one or more parity stripes using the plurality of data chunks stored in the write-ahead log;
  store the plurality of data stripes and the one or more parity stripes on corresponding different storage devices; and
  associate together the plurality of data stripes and the one or more parity stripes under a data protection grouping container; and a memory coupled to the processor and configured to provide the processor with instructions.

* * * * *